United States Patent [19]
Tran

[11] Patent Number: 5,987,235
[45] Date of Patent: Nov. 16, 1999

[54] METHOD AND APPARATUS FOR PREDECODING VARIABLE BYTE LENGTH INSTRUCTIONS FOR FAST SCANNING OF INSTRUCTIONS

[75] Inventor: Thang M. Tran, Austin, Tex.

[73] Assignee: Advanced Micro Devices, Inc., Sunnyvale, Calif.

[21] Appl. No.: 08/835,082

[22] Filed: Apr. 4, 1997

[51] Int. Cl.⁶ ...................................................... G06F 9/38
[52] U.S. Cl. ...................... 395/386; 395/389; 395/800.23
[58] Field of Search ..................... 395/380, 381, 395/383, 384, 386, 388, 389, 800.23

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,442,760 | 8/1995 | Rustad et al. ............................ 395/391 |
| 5,488,710 | 1/1996 | Sato et al. ................................ 711/125 |
| 5,513,330 | 4/1996 | Stiles ....................................... 395/380 |
| 5,535,347 | 7/1996 | Grochowski et al. ................... 395/375 |
| 5,586,276 | 12/1996 | Grochowski et al. ................... 395/380 |
| 5,625,787 | 4/1997 | Mahin et al. ............................ 395/380 |
| 5,651,125 | 7/1997 | Witt et al. . |
| 5,758,114 | 5/1998 | Johnson et al. ......................... 395/380 |
| 5,809,273 | 9/1998 | Favor et al. ............................. 395/386 |
| 5,822,558 | 10/1998 | Tran ........................................ 395/389 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 1994 Pentium Processor Family User's Manual, vol. 1: Pentium Processor Family Data Book, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "p6: The Next Step?," PC Magazine, Sep. 12, 1995, 16 pages.

Tom R. Halfhill, "AMD K6 Takes On Intel P.6," BYTE, Jan. 1996, 4 pages.

Primary Examiner—Meng-Ai T. An
Assistant Examiner—Joseph Paul Schweiss
Attorney, Agent, or Firm—Conley, Rose & Tayon, PC; B. Noel Kivlin

[57] ABSTRACT

A superscalar microprocessor is provided that includes a predecode unit configured to predecode variable byte-length instructions prior to their storage within an instruction cache. The predecode unit is configured to generate a plurality of predecode bits for each instruction byte. The plurality of predecode bits, called a predecode tag, associated with each instruction byte include a number of bits that indicates a number of byte positions to shift each instruction byte in order to align the instruction byte with a decode unit. Each decode unit includes a fixed number of instruction byte positions for storing bytes of instructions. A start byte of an instruction is conveyed to a first instruction byte position. The predecode tags are used by a multiplex and shift unit of an instruction alignment unit to shift the instruction bytes such that the start byte of an instruction is stored in a first instruction byte position of a decode unit. The subsequent instruction bytes of an instruction are stored in the remaining instruction bytes of the decode unit. Accordingly, relatively fast multiplexing of instructions may be obtained. The instruction alignment unit is not required to scan the instruction bytes for start bytes and end bytes. The predecode tag for each instruction byte indicates a number of byte positions to shift that byte. Accordingly, the instruction alignment unit mnay be a simple multiplexing and shift unit.

20 Claims, 11 Drawing Sheets

| Prefix 0-4 bytes (Optional) 102 | Opcode 1-2 bytes 104 | Mod R/M 0-1 byte (optional) 106 | S-I-B 0-1 byte (optional) 108 | Displacement 0,1,2,or 4 bytes (optional) 110 | Immediate 0,1,2, or 4 bytes (optional) 112 |

Generic X 86 Instruction Format

Instruction Position  0
                      —
                      1

Instr. Line 0         I0  I1  I2  I3  I4  I5  I6  I7  I8  I9  I10
Predecode Line 0      0   2   4   0   2   4   0   2   4   0   2

Instruction Line1     I11 I12 I13 I14 I15 I16 I17 I18 I19 I20 I21
Predecode Line1       4   0   2   4   0   2   4   0   2   4   0

Byte Position         0   1   2   3   4   5   6   7   8

| | Decode Unit A | | Decode Unit B | | Decode Unit C | |
|---|---|---|---|---|---|---|
| Clock Cycle 0 | I0  | N | I1  | N | I2  | N |
| Clock Cycle 1 | I3  | N | I4  | N | I5  | N |
| Clock Cycle 2 | I6  | N | I7  | N | I8  | N |
| Clock Cycle 3 | I9  | N | I10 | N | I11 | N |
| Clock Cycle 4 | I12 | N | I13 | N | I14 | N |
| Clock Cycle 5 | I15 | N | I16 | N | I17 | N |
| Clock Cycle 6 | I18 | N | I19 | N | I20 | N |
| Clock Cycle 7 | I21 | N | ... | | | |

FIG. 4A

| Instruction Position | 0 | 1 | | | | 5 | | | | | 10 |
|---|---|---|---|---|---|---|---|---|---|---|---|
| Instr. Line 0 | 10 | 10 | 10 | 10 | I1 | I1 | I2 | I2 | I2 | I2 | |
| Predecode Line 0 | 0 | 0 | 0 | 0 | 2 | 2 | 0 | 0 | 0 | 0 | |
| Instruction Line1 | I2 | I3 | I4 | I4 | I5 | I5 | I6 | I6 | I6 | I6 | |
| Predecode Line1 | 4 | 5 | 0 | 0 | 1 | 1 | 0 | 0 | 0 | 0 | |

| Byte Position | 0 | 1 | 2 | 3 | 4 | 5 | 6 | 7 | 8 |
|---|---|---|---|---|---|---|---|---|---|

| | Decode Unit A | | | Decode Unit B | | Decode Unit C | |
|---|---|---|---|---|---|---|---|
| Clock Cycle 0 | 10 | 10 | 10 | 10 | N | I1 | I1 |
| Clock Cycle 1 | 12 | 12 | 12 | 12 | 12 | I3 | N |
| Clock Cycle 2 | 14 | 14 | N | 15 | 15 | N | N |
| Clock Cycle 3 | 16 | 16 | 16 | 16 | 16 | ... | N |

FIG. 4B

| Instruction Position | 0 | | | | 5 | | | | | | 10 |
|---|---|---|---|---|---|---|---|---|---|---|---|
| Instr. Line 0 | 10 | 10 | 10 | 11 | 11 | 12 | 12 | 12 | 13 | 13 | 13 |
| Predecode Line 0 | 0 | 0 | 0 | 0 | 0 | 1 | 1 | 1 | 0 | 0 | 0 |
| Instruction Line1 | 14 | 14 | 15 | 15 | 15 | 16 | 16 | 16 | 17 | 17 | 17 |
| Predecode Line1 | 3 | 3 | 4 | 4 | 4 | 0 | 0 | 0 | 0 | 0 | 0 |
| Instruction Line2 | 18 | 18 | 18 | ... | | | | | | | |
| Predecode Line2 | 6 | 6 | 6 | ... | | | | | | | |

| Byte Position | 0 | 1 | 2 | 3 | 4 | 5 | 6 | 7 | 8 |
|---|---|---|---|---|---|---|---|---|---|

| | Decode Unit A | | | Decode Unit B | | | Decode Unit C | | |
|---|---|---|---|---|---|---|---|---|---|
| Clock Cycle 0 | 10 | 10 | 10 | 11 | 11 | N | 12 | 12 | 12 |
| Clock Cycle 1 | 13 | 13 | 13 | 14 | 14 | N | 15 | 15 | 15 |
| Clock Cycle 2 | 16 | 16 | 16 | 17 | 17 | 17 | 18 | 18 | 18 |

FIG. 4C

I4 Branches to I8

| Instruction Position | 0 | | | | | | | | | 5 | | | | | 10 |
|---|---|---|---|---|---|---|---|---|---|---|---|---|---|---|---|
| Instr. Line 0 | I0 | I0 | I0 | I0 | I1 | I1 | I2 | I2 | I2 | I2 | I3 | I3 | I3 | I3 | |
| Predecode Line 0 | 0 | 0 | 0 | 0 | 0 | 0 | 1 | 1 | 1 | 1 | 0 | 0 | 0 | 0 | |
| Instruction Line1 | I4 | I4 | ... | ... | | | | | | | | | | | |
| Predecode Line1 | 3 | 3 | ... | ... | | | | | | | | | | | |
| Instruction Line2 | I8 | I8 | I8 | ... | | | | | | | | | | | |
| Predecode Line2 | 4 | 4 | 4 | ... | | | | | | | | | | | |

| Byte Position | 0 | 1 | 2 | 3 | 4 | 5 | 6 | 7 | 8 |
|---|---|---|---|---|---|---|---|---|---|

|  | Decode Unit A | Decode Unit B | Decode Unit C |
|---|---|---|---|
| Clock Cycle 0 | I0<br>I3 | I1<br>I4 | I2<br>I8 |
| Clock Cycle 1 | I0<br>I3 | I1<br>I4 | I2<br>I8 |
|  | | N<br>N | I2<br>I8 |

FIG. 4D

I4 Branches to I1

| Instruction Position | 0 | | | | | | | 5 | | | | | 10 |
|---|---|---|---|---|---|---|---|---|---|---|---|---|---|
| Instr. Line 0 | I0 | I0 | I0 | I0 | I1 | I1 | I2 | I2 | I2 | I3 | I3 | I3 | I3 |
| Predecode Line 0 | 0 | 0 | 0 | 0 | 0 | 1 | 1 | 1 | 1 | 0 | 0 | 0 | 0 |
| Instruction Line1 | I4 | I4 | ... | ... | | | | | | | | | |
| Predecode Line1 | 3 | 3 | | | | | | | | | | | |

| Byte Position | 0 | 1 | 2 | 3 | 4 | 5 | 6 | 7 | 8 |
|---|---|---|---|---|---|---|---|---|---|
| | Decode Unit A | | | | Decode Unit B | | | | Decode Unit C |
| Clock Cycle 0 | I0 | I0 | I0 | I0 | I1 | I1 | | I2 | I2 |
| Clock Cycle 1 | I3 | I3 | I3 | I3 | I4 | I4 | | N | N |
| Clock Cycle 2 | N | N | N | N | I1 | I1 | | I2 | I2 |
| Clock Cycle 3 | I3 | I3 | I3 | I3 | ... | | | I2 | I2 |

FIG. 4E

METHOD AND APPARATUS FOR PREDECODING VARIABLE BYTE LENGTH INSTRUCTIONS FOR FAST SCANNING OF INSTRUCTIONS

BACKGROUND OF THE INVENTION

1. Field of the Invention

This invention relates to superscalar microprocessors and more particularly to the predecoding of variable byte-length computer instructions within high performance and high frequency superscalar microprocessors.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte-length instructions. A generic format illustrative of the x86 instruction set is shown in FIG. 1A. As illustrated in the figure, an x86 instruction consists of from one to four optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. ModR/M byte 106 specifies the registers used as well as memory addressing modes. SIB byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The 80286 sets a maximum length for an instruction at 10 bytes, while the 80386 and 80486 both allow instruction lengths of up to 15 bytes.

Referring now to FIG. 1B, several different variable byte-length x86 instruction formats are shown. The shortest x86 instruction is only one byte long, and comprises a single opcode byte as shown in format (a). For certain instructions, the byte containing the opcode field also contains a register field as shown in formats (b), (c) and (e). Format (j) shows an instruction with two opcode bytes. An optional ModR/M byte follows opcode bytes in formats (d), (f), (h), and (j). Immediate data follows opcode bytes in formats (e), (g), (i), and (k), and follows a ModR/M byte in formats (f) and (h). FIG. 1C illustrates several possible addressing mode formats (a)–(h). Formats (c), (d), (e), (g), and (h) contain ModR/M bytes with offset (i.e., displacement) information. An SIB byte is used in formats (f), (g), and (h).

The complexity of the x86 instruction set poses difficulties in implementing high performance x86 compatible superscalar microprocessors. One difficulty arises from the fact that instructions must be aligned with respect to the parallel-coupled instruction decode units of such processors before proper decode can be effectuated. In contrast to most RISC instruction formats, since the x86 instruction set consists of variable byte-length instructions, the start bytes of successive instructions within a line are not necessarily equally spaced, and the number of instructions per line is not fixed. As a result, employment of simple, fixed-length shifting logic cannot in itself solve the problem of instruction alignment.

Superscalar microprocessors have been proposed that employ instruction predecoding techniques to help solve the problem of quickly aligning, decoding and executing a plurality of variable byte-length instructions in parallel. In one such superscalar microprocessor, when instructions are written within the instruction cache from an external main memory, a predecoder appends several predecode bits (referred to collectively as a predecode tag) to each byte. For example, these bits may indicate whether the byte is the start and/or end byte of an x86 instruction, and the location of opcode bytes and prefix bytes. An instruction scan unit then scans the predecode tags to determine the boundaries of each instruction and conveys each instruction to a decoder. The circuitry to scan for start and end bytes and convey the instructions to a decode unit based on the start and end bytes is complex and relatively slow. The predecode tag associated with an instruction byte does not contain sufficient information to align the instruction byte. The predecode tags of a plurality of instruction bytes must be scanned to determine the boundaries of instructions, to determine to which decode unit to convey each instruction, and to convey the instruction bytes to the appropriate decode unit.

SUMMARY OF THE INVENTION

The problems outlined above are in large part solved by a method and apparatus for predecoding variable byte-length instructions in accordance with the present invention. A predecode unit is provided to predecode variable byte-length instructions prior to storage within an instruction cache. The predecode unit is configured to generate a plurality of predecode bits for each instruction byte. The predecode bits associated with each instruction byte are collectively referred to as a predecode tag. The predecode tag indicates how many byte positions to shift the associated instruction byte to align the instruction byte with the proper decode unit. The alignment of each instruction byte is determined during predecode. The alignment is determined relative to the position in which the instruction byte will be stored in the instruction cache. The predecode tag indicates the number of byte positions to shift an instruction byte as it is conveyed from the instruction cache to the decode units.

An instruction alignment unit receives the instruction bytes and the associated predecode tags. The predecode tags control a multiplexing and shifting network that conveys the instruction bytes to the appropriate decode units as indicated by the predecode tag. The present invention advantageously eliminates scanning the instruction bytes for start and/or end bytes. The present invention advantageously allows instruction bytes to be routed to the appropriated decode units based on only the predecode tag of the associated instruction byte. The shifting of the instruction byte is not dependent on the predecode tags of other instruction bytes.

Broadly speaking, the present invention contemplates a microprocessor including an instruction cache, a predecode unit, a plurality of decode units, and an instruction alignment unit. The instruction cache stores a plurality of instructions. Each of the plurality of instructions includes one or more instruction bytes. The predecode unit is coupled to the instruction cache and configured to generate a predecode tag associated with an instruction byte of one of the plurality of instructions. The predecode tag indicates a number of byte positions to shift the instruction byte. A first decode unit decodes a designated instruction conveyed to the first decode unit. The instruction alignment unit is coupled between the instruction cache and the plurality of decode units. The instruction alignment unit conveys the instruction byte to one of the plurality of decode units based on the predecode tag. The designated instruction includes one or more instruction bytes conveyed to the first decode unit.

The present invention further contemplates a method of aligning variable-byte length instructions comprising: fetching the variable-byte length instructions from memory and storing the variable-byte length instructions in an instruction cache; generating a predecode tag indicative of a number of byte positions to shift an instruction byte of a first instruction of the variable-byte length instructions; and shifting the instruction byte of the first instruction to one of a plurality of decode units based on the predecode tag.

The present invention still further contemplates a computer system including a microprocessor, a main memory coupled to the microprocessor, a bus bridge coupled to the microprocessor, and an input/output device coupled to the bus bridge. The microprocessor includes an instruction cache, a predecode unit, a plurality of decode units, and an instruction alignment unit. The instruction cache stores a plurality of instructions. Each of the plurality of instructions includes one or more instruction bytes. The predecode unit is coupled to the instruction cache and configured to generate a predecode tag associated with an instruction byte of one of the plurality of instructions. The predecode tag indicates a number of byte positions to shift the instruction byte. A first decode unit decodes a designated instruction conveyed to the first decode unit. The instruction alignment unit is coupled between the instruction cache and the plurality of decode units. The instruction alignment unit conveys the instruction byte to one of the plurality of decode units based on the predecode tag. The designated instruction includes one or more instruction bytes conveyed to the first decode unit.

BRIEF DESCRIPTION OF THE DRAWINGS

Other objects and advantages of the invention will become apparent upon reading the following detailed description and upon reference to the accompanying drawings in which:

FIG. 1A is a diagram which illustrates the generic x86 instruction set format.

FIGS. 4A–4E are diagrams illustrating the routing of instruction bytes from an instruction cache to a plurality of decode units based upon predecode tags in accordance with the present invention.

Figure 1B:
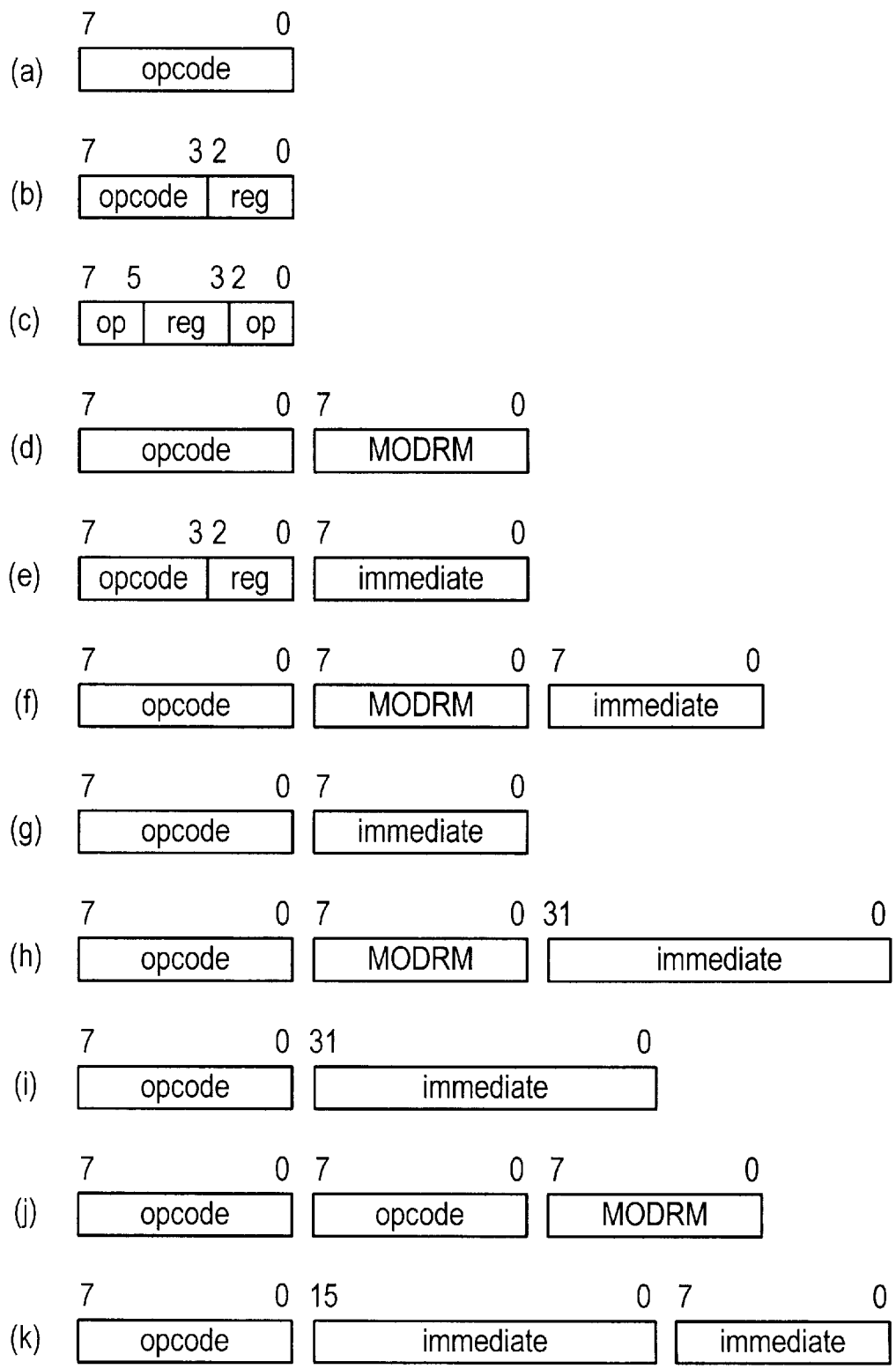
FIG. 1B is a diagram which illustrates several different variable byte-length x86 instruction formats.
Figure 1C:
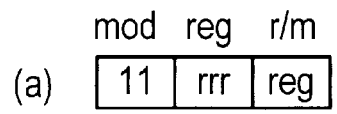
FIG. 1C is a diagram which illustrates several possible x86 addressing mode formats.
Figure 1C:
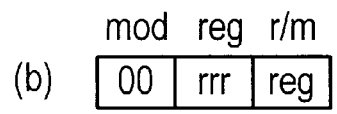
Figure 1C:
Figure 1C:
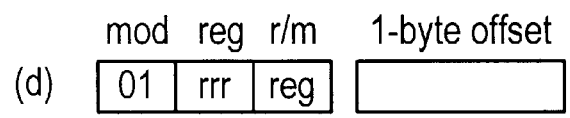
Figure 1C:
Figure 1C:
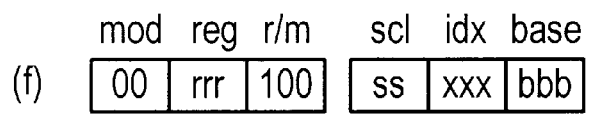
Figure 1C:
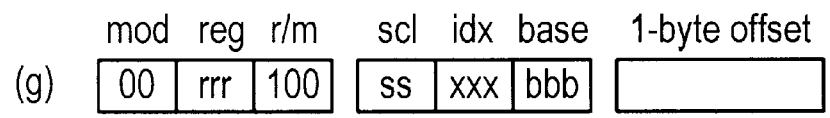
Figure 1C:
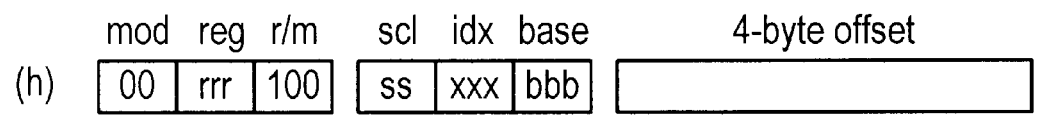

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
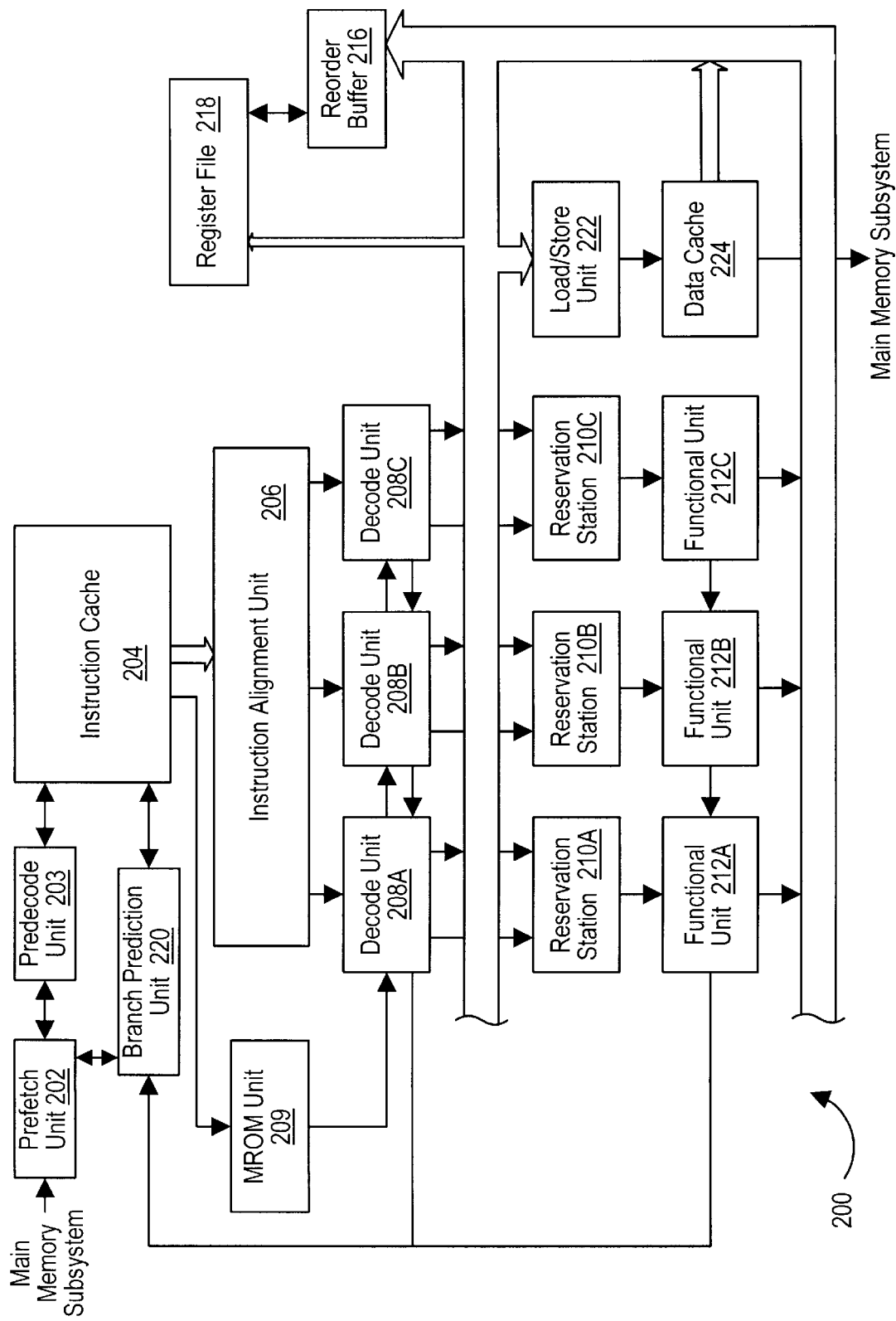
FIG. 2 is a block diagram of a superscalar microprocessor which includes an instruction alignment unit to forward multiple instructions to three decode units.

Referring next to FIG. 2, a block diagram of a superscalar microprocessor 200 including a predecode unit 203 which operates in accordance with a method of the present invention is shown. As illustrated in the embodiment of FIG. 2, superscalar microprocessor 200 includes a predecode unit 203 and a branch prediction unit 220 coupled to an instruction cache 204. A prefetch unit 203 is coupled to predecode unit 203. An instruction alignment unit 206 is coupled between instruction cache 204 and a plurality of decode units 208A–208C (referred to collectively as decode units 208). Each decode unit 208A–208C is coupled to a respective reservation station 210A–210C (referred collectively as reservation stations 210), and each reservation station 210A–210C is coupled to a respective functional unit 212A–212C (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction cache 204 and decode units 208.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 32 bytes each (where each byte consists of 8 bits). During operation, instruction code is provided to instruction cache 204 by prefetching code from a main memory (not shown) through prefetch unit 202. For each byte of instruction code, instruction cache 204 further stores a predecode tag associated therewith. It is noted that instruction cache 204 could be implemented in a set-associative, a fully-associative, or a direct-mapped configuration.

Prefetch unit 202 is provided to prefetch instruction code from the main memory for storage within instruction cache 204. In one embodiment, prefetch unit 202 is configured to burst 64-bit wide code from the main memory into instruction cache 204. It is understood that a variety of specific code prefetching techniques and algorithms may be employed by prefetch unit 202.

As prefetch unit 202 fetches instructions from the main memory, predecode unit 203 generates a predecode tag associated with each instruction byte of instruction code. In one embodiment, the predecode tag includes a plurality of predecode bits. The predecode tag indicates a number of byte positions to shift an instruction byte to align that instruction byte with the appropriate decode unit. The number of bits of the predecode tag is determined by the maximum number of byte positions an instruction byte is shifted by the instruction alignment unit. For example, if the instruction alignment unit shifts an instruction byte up to 7 byte positions, then the predecode tag is 3 bits. Alternatively, if the instruction alignment unit shifts an instruction byte up to 15 byte positions, then the predecode tag is 4 bits. The predecode tag may include additional bits conveying additional information regarding the instruction byte or the instruction. For example, the predecode tag may include a bit indicating whether the associated instruction can be directly decoded by decode units 208 or whether the instruction must be executed by invoking a microcode procedure controlled by MROM unit 209, or bits indicating whether the associated instruction byte is a start byte, an end byte, a ModR/M byte, an SIB byte, displacement byte, immediate byte or opcode byte.

The instruction bytes and associated predecode data are stored in instruction cache 204. As an instruction is conveyed from instruction cache 204 to instruction alignment unit 206, the predecode tags of the instruction bytes are also conveyed to instruction alignment unit 206. Instruction alignment unit 206 is provided to convey instruction bytes from instruction cache 204 to fixed issue positions formed by decode units 208A–208C. The predecode tag of each instruction byte indicates the number of byte positions to shift the associated instruction byte to align that instruction byte with the appropriate decode unit 208. In one embodiment, the predecode tag indicates a number of byte positions relative to the current position of the instruction byte within the line of instruction bytes received from instruction cache 204. Therefore, if the third instruction byte of a line of instruction bytes has a predecode tag of 2, that instruction byte is shifted two byte positions to the fifth instruction byte position of decode units 208.

In one embodiment, each decode unit is allocated a fixed number of instruction byte positions. A start byte of an instruction is routed to a first instruction byte position of a decode unit. The additional bytes of the instruction are routed to other instruction bytes within the decode unit. If the instruction includes more instruction bytes than available instruction byte positions in a decode unit, the additional, or overflow, instruction bytes are routed to a subsequent decode unit. Each decode unit attempts to decode the instruction bytes routed to that decode unit. If the instruction byte stored in the first instruction byte position is not a start byte, then the decode unit is storing overflow bytes of another decode unit and routes those instruction bytes to the appropriate decode unit.

In the present invention, the alignment of an instruction byte is dependent only upon the predecode tag of that instruction byte. There is no requirement to scan the predecode tags of other instruction bytes to determine the boundaries of an instruction. Each instruction byte is routed directly to an instruction byte position based on the predecode tag associated with that instruction byte.

In one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. When an MROM instruction is encountered, MROM unit 209 parses and serializes the instruction into a subset of defined fast path instructions to effectuate a desired operation.

Before proceeding with a more detailed description of the alignment of instructions from instruction cache 204 to decode units 208, general aspects regarding other subsystems employed within the exemplary superscalar microprocessor 200 of FIG. 2 will be described. For the embodiment of FIG. 2, each of the decode units 208 includes decoding circuitry for decoding the fast-path instructions referred to above. In addition, each decode unit 208A–208C routes displacement and immediate data to a corresponding reservation station unit 210A–210C. Output signals from the decode units 208 include bit-encoded execution instructions for the functional units 212 as well as operand address information, immediate data and/or displacement data.

The superscalar microprocessor of FIG. 2 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208C are routed directly to respective reservation station units 210A–210C. In one embodiment, each reservation station unit 210A–210C is capable of holding instruction information (i.e., bit encoded execution bits as well as operand values, operand tags and/or immediate data) for up to three pending instructions awaiting issue to the corresponding functional unit. It is noted that for the embodiment of FIG. 2, each decode unit 208A–208C is associated with a dedicated reservation station unit 210A–210C, and that each reservation station unit 210A–210C is similarly associated with a dedicated functional unit 212A–212C. Accordingly, three dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, E,BX, ECX, EDX, EBP, ESI, EDI and ESP), as will be described further below. Reorder buffer 216 contains temporary storage locations for results which change the contents of these registers to thereby allow out of order execution. A temporary storage location of reorder buffer 216 is reserved for each instruction which, upon decode, modifies the contents of one of the real registers. Therefore, at various points during execution of a particular program, reorder buffer 216 may have one or more locations which contain the speculatively executed contents of a given register. If following decode of a given instruction it is determined that reorder buffer 216 has previous location(s) assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J. 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210C are provided to temporarily store instruction information to be speculatively executed by the corresponding functional units 212A–212C. As stated previously, each reservation station unit 210A–210C may store instruction information for up to three pending instructions. Each of the four reservation stations 210A–210C contain locations to store bit-encoded execut executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212C, the result of that instruction is passed directly to any reservation station units 210A–210C that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210C has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 203 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210C where pending instructions may be waiting for the results of previous instruction executions to obtain the required operand values.

Generally speaking, load/store unit 222 provides an interface between functional units 212A–212C and data cache 224. In one embodiment, load/store unit 222 is configured with a store buffer with eight storage locations for data and address information for pending loads or stores. Functional units 212 arbitrate for access to the load/store unit 222. When the buffer is full, a functional unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Figure 3:
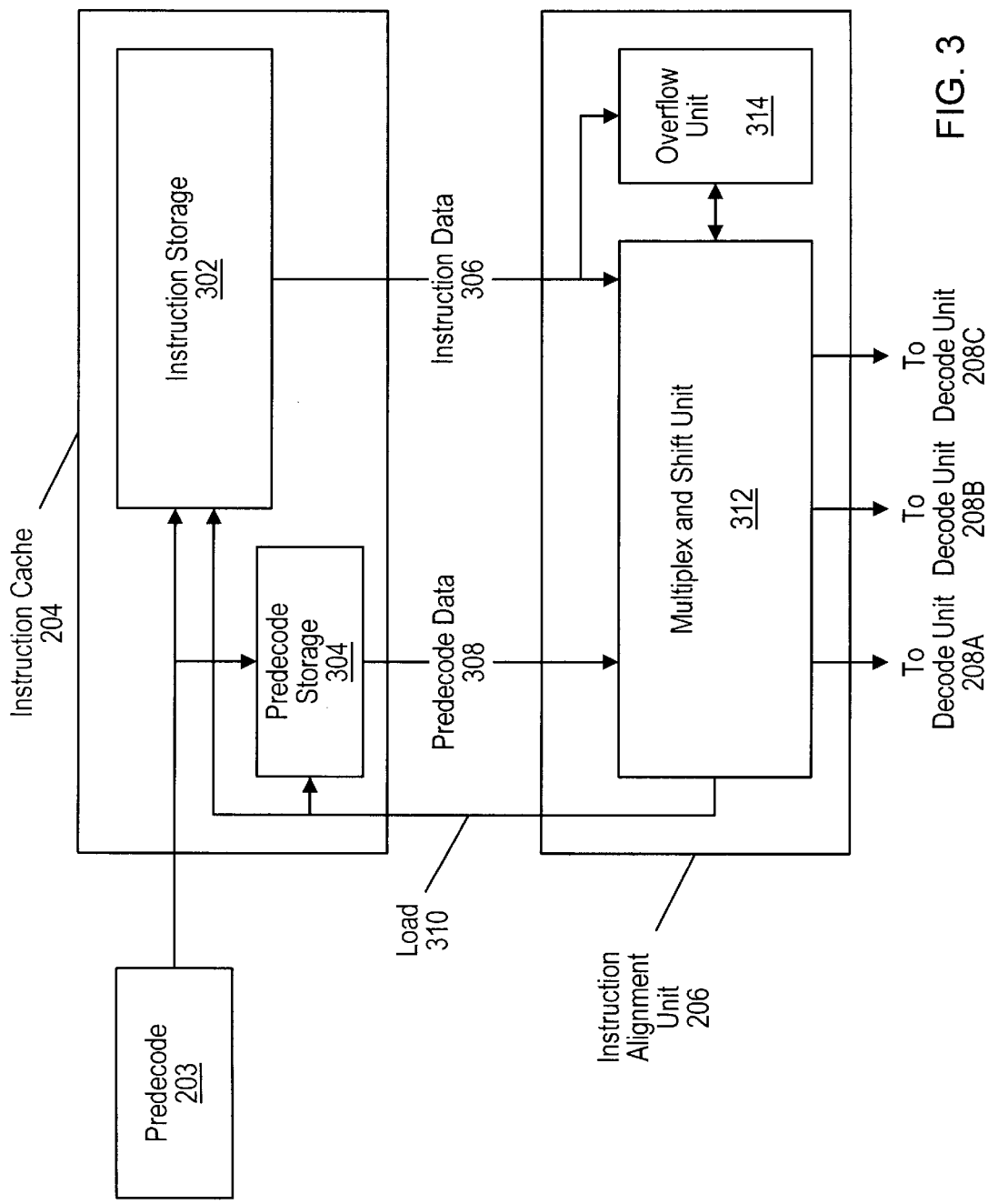
FIG. 3 is a block diagram of one embodiment of a predecode unit, an instruction cache and an instruction alignment unit.

Turning now to FIG. 3, a block diagram of one embodiment of predecode unit 203, instruction cache 204 and instruction alignment unit 206 is shown. Instruction cache 204 includes instruction storage 302 and predecode storage 304. Instruction alignment 206 includes multiplex and shift unit 312 and overflow unit 314. Predecode unit 203 receives instruction data from prefetch unit 202 (not shown). Predecode unit 203 generates a predecode tag for each instruction byte of the instruction data. Predecode unit 203 conveys the instruction data and the predecode tags to instruction cache 204. The instruction bytes received from predecode unit 203 are stored in instruction storage 302. The predecode tags received from predecode unit 203 are stored in predecode storage 304. Instruction storage 302 and predecode storage 304 are conventional devices for storing data. For example, instruction storage 302 and predecode storage 304 may be random access memory (RAM). In a preferred embodiment, instruction storage 302 and predecode storage 304 are first-in first-out (FIFO) devices. Data from FIFO devices is output in the same order in which the data is input. As the name implies, data that is stored early is output early. In one embodiment, instruction bytes and the predecode tags associated with the instruction bytes are synchronized such that data is stored to and read from instruction storage 302 and predecode storage 304 during the same clock cycle. In other words, when an instruction line is output to instruction alignment unit 206, the predecode tags associated with the instruction bytes in that instruction line are also output to instruction alignment unit 206.

Instruction alignment unit 206 receives predecode tags on predecode data line 308 and instruction bytes on instruction data line 306. Multiplex and shift unit 312 routes the instruction bytes to decode units 208. In the illustrated embodiment, multiplex and shift unit 312 routes instruction bytes to one of three decode units (208A–208C). In other embodiments, another number of decode units may be utilized.

When multiplex and shift unit 312 receives a line of instruction bytes, or an instruction line, from instruction storage 302, it also receives a plurality of predecode tags. Each predecode tag is associated with one instruction byte of the instruction line. The predecode tag is indicative of a number of byte positions to shift the associated instruction byte to align the instruction byte with the appropriate decode unit for that instruction byte. Therefore, the predecode tag of each instruction byte indicates the decode unit to which multiplex and shift unit 312 conveys an instruction byte.

In one embodiment, multiplex and shift unit 312 receives an instruction line with 6 instruction bytes from instruction storage 302. If a instruction line received from instruction storage 302 includes more than 3 instructions, multiplex and shift unit 312 conveys the first three instructions to decode units 208. If the remaining instruction bytes of the instruction line include 3 or more instructions, the remaining instruction bytes are shifted down to replace the instruction bytes dispatched to decode units 208. The next 3 instructions are then dispatched to decode units 208. When less than 3 instructions remain in an instruction line within multiplex and shift unit 312, a new instruction line and associated predecode tags are received from instruction cache 204. Multiplex and shift unit 312 outputs a load signal on load signal line 310 causing instruction storage 302 and predecode storage 304 to provide the new data. Prior to the loading of the new instruction line, the remaining instruction bytes within multiplex and shift unit 312 are conveyed to overflow unit 314. The remaining, or overflow, instruction bytes and the new instruction bytes conveyed from instruction storage 302 are routed to decode units 208 as controlled by the predecode tags.

In one embodiment, each decode unit includes a plurality of instruction byte positions for storing instruction bytes allocated to that decode unit. For example, each predecode unit may be allocated 10 instruction byte positions. No more than one instruction is conveyed to a decode unit per clock cycle. Therefore, if an instruction with less than 10 instruction bytes is allocated to a decode unit, then one or more of the instruction byte positions are not used. The predecode tags are generated such that the first instruction byte of an instruction is routed to a first instruction byte position of a decode unit. Subsequent instruction bytes of the instruction are conveyed to other instruction byte positions of the decode unit. If an instruction contains more instruction bytes than the allocated number of instruction byte positions in a decode unit, the additional, or overflow, instruction bytes are conveyed to a subsequent decode unit. Each decode unit decodes the instruction bytes conveyed to that decode unit. A decode unit with overflow instruction bytes for a previous decode unit will recognize that it does not have the instruction bytes for a complete instruction and convey the instruction bytes to the previous decode unit. The decode unit with the overflow instruction bytes will issue a NOOP instruction for that clock cycle. For example, if an instruction includes 12 instruction bytes, the first 10 instruction bytes are conveyed to a first decode unit. Because the decode unit can only store 10 instruction bytes, the remaining 2 instruction bytes are conveyed to a second decode unit. When the decode units attempt to decode their respective instructions, the second decode unit will recognize that the instruction bytes conveyed to that decode unit do not comprise a valid instruction. Therefore, the second decode unit conveys the additional instruction bytes to the first decode unit. The first decode unit will recognize that the instruction bytes conveyed to that decode unit do not comprise the full number of instruction bytes and wait for the additional instruction bytes. After the first decode unit has received the additional instruction bytes from the second decode unit, it completes the decoding of the instruction.

The predecode tag for each instruction byte is generated such that the first instruction byte of an instruction is routed to a first instruction byte position of a decode unit. For example, if a first instruction within an instruction line includes 8 instruction bytes, multiplex and shift unit 312 will route the 8 bytes to decode unit 208A. The predecode tag of the first byte of the next instruction will cause multiplex and shift unit 312 to skip the next two instruction bytes and shift the instruction bytes of the second instruction to decode unit 208B. If the second instruction includes three instruction bytes, the predecode tag for the first instruction byte of the third instruction will cause multiplex and shift unit 312 to skip the next 7 instruction byte positions of decode unit 208B and convey the instruction bytes of the third instruction to decode unit 208C.

Predecode unit 202 decodes the instruction bytes to determine the number of instructions and length of each instruction read from external, memory. Based on the number of instructions, length of each instruction, the number of decode units and the number of instruction byte positions within the decode units, predecode unit 203 determines the allocation of instructions and instruction bytes to the decode units. Additionally, predecode unit 203 determines the position that each instruction byte will be stored in instruction cache 204. Because the storage location within instruction cache 204 and the position within a decode unit to which an instruction byte will be allocated is known, predecode unit 203 is able to determine the number of byte positions each instruction byte needs to be shifted in order to align the instruction byte with the appropriate instruction byte position and the appropriate decode unit. The number of byte positions to shift an instruction byte is stored as a predecode tag associated with that instruction byte.

When a "taken branch" instruction branch instruction is encountered, two situations may arise. A "taken branch" is a branch instruction which is predicted to be taken by branch prediction unit 220 (not shown). The first situation that may arise is that the target instruction of the taken branch is an instruction for which predecode tag:s have not yet been generated. A target instruction is the instruction to which the branch instruction will jump if the branch is taken. In this situation, the predecode tags are generated as if the target instruction was contiguously stored with the taken branch instruction. The second situation that may arise is that the taken branch instruction branches to a target instruction for which predecode tags have already been generated. In one embodiment, predecode tags are not regenerated. The existing predecode tags are used. In another embodiment, the predecode tags for the target instruction and subsequent instructions are regenerated as if the target instruction is contiguously stored with the taken branch instruction.

FIGS. 4A–4D illustrate the alignment of instruction bytes from instruction cache 204 to decode unit 208. In the illustrated embodiments, each instruction line of instruction storage 302 includes 11 instruction bytes. The illustrated embodiment includes 3 issue positions and therefore 3 decode units (208A–208C). Each decode unit includes 3 instruction byte positions. The number of instruction bytes per instruction line, the number of decode units and the number of instruction byte positions per decode unit are for illustrative purposes only. Other embodiments, that include varying numbers of bytes per instruction line, decode units, and instruction byte positions are also contemplated.

Turning now to FIG. 4A, the alignment of an instruction line that includes a plurality of single byte instructions is illustrated. Single byte instructions provide the least effective utilization of instruction byte positions. Only one of the three instruction byte positions of each decoder is utilized. Prior to writing instruction bytes to the instruction byte positions of decode units 208, a bit combination is written to each instruction byte position indicating that that position is non-utilized (illustrated by the letter "N" in the figure). For example, a bit combination representing a NOOP instruction may be written to each instruction byte position. If an instruction byte is conveyed to an instruction byte position, the instruction byte overwrites the non-utilized bit combination. If no instruction. byte is written to an instruction byte position, the non-utilized bit combination indicates to the decoder that that byte position is non-utilized.

In FIG. 4A, two lines of instruction cache 204 are illustrated. Instruction line 0 is earlier in program order than instruction line 1. Predecode line 0 is associated with instruction line 0 and predecode line 1 is associated with instruction line 1. Each predecode tag is associated with one instruction byte. FIG. 4A illustrates the assignment of instruction bytes to each decode unit. The assignment of instructions to the instruction byte positions of decode units 208A–208C is illustrated for 8 clock cycles. Clock cycle 0 occurs earliest in program order. In the illustrated embodiment, the predecode tag associated with an instruction byte indicates the number of byte positions to shift each instruction byte. The number of byte positions to shift an instruction byte is relative to the position within the instruction cache at which the instruction byte is stored. If the value of the predecode tag decreases between two successive predecode tags, the second instruction byte is dispatched in the following clock cycle. As discussed above, each decoder has a fixed number of instruction byte positions. The first instruction byte of each instruction is routed to a first instruction byte position of a decode unit. In the illustrated embodiment, the first instruction byte position is the left-most byte position. For the purposes of this disclosure, each instruction byte within an instruction line is assigned a position number. The left-most instruction byte is instruction position 0 and is the earliest instruction in the program order. The right-most instruction byte is instruction position 10 and is last in program order. Additionally, for the purposes of this disclosure, the instruction byte positions of the decoders are sequentially numbered. For example, the first instruction byte position of decoder 208A will be referred to as instruction byte position 0. The first instruction byte position of decoder 208B will be referred to as byte position 3. The first instruction byte position of decoder 208C will be referred to as byte position 6.

The predecode tag for the only instruction byte of instruction I0 indicates that no shifting is required. Therefore, I0 is conveyed to byte position 0 in cycle 0. As discussed above, the first byte of each instruction is routed to a first byte position of a decode unit. Therefore, the first and only instruction byte of instruction I1 is routed to the first byte position of decode unit 208B (byte position 3). The predecode tag associated with instruction I1 indicates that I1 is shifted by 2 byte positions. Because I1 is stored in position 1 of the instruction line, shifting I1 two byte positions conveys I1 to byte position 3. Byte positions 1 and 2 are not utilized. In a similar manner, the predecode tag of instruction I2 indicates that I2 is shifted 4 byte positions. Because I2 is stored in instruction position 2, it is shifted to byte position 6. As desired, I2 is shifted to a first instruction byte position of decoder 208C. The predecode tag value decreases between I2 and I3. A decrease in predecode tag value indicates that the latter instruction is dispatched in a subsequent clock cycle. Therefore, instructions I0, I1 and I2 are conveyed to decode units 208A through 208C, respectively, in cycle 0. In one embodiment, after I0, I1 and I2 are issued, the remaining instruction bytes are shifted down. After the first instructions have been dispatched to decode units 208, instruction I3 is in instruction position 0, I4 is in instruction position 1 and I5 is in instruction position 2. In a manner similar to that discussed above with reference to instructions I0 through I2, I3 through I5 are dispatched to decode units 208A through 208C. In another embodiment, I3 through I5 are dispatched to decode units 208A through 208C without shifting the instruction bytes. Likewise, instructions I6 through I8 are dispatched to decode units 208A through 208C in clock cycle 2. In clock cycle 3, there are only two instruction bytes remaining in the instruction line. In one embodiment, instruction I9 is conveyed to byte position 0 and instruction I10 is conveyed to byte position 3. Instruction line 1 is then loaded from instruction storage 302 and the associated predecode tags are loaded from predecode storage 304. Instruction I11 is stored in instruction line position 0 and the predecode tag of the first and only instruction is 6. Therefore, as desired, I11 is conveyed to the first byte position of decoder 208C (byte position 6). In a manner similar to that discussed above, instructions I12 through I21 are dispatched in cycles 4 through 7. In an alternative embodiment, I9 and I10 are stored in overflow unit 314. Instruction line 1 is loaded and I9, I10 and I11 are dispatched concurrently.

Turning now to FIG. 4B, an example of the alignment of varying byte-length instructions is illustrated. The first instruction in instruction line 0, I0, includes four instruction bytes. Each instruction byte of I0 has a predecode tag of 0. Therefore, the instruction bytes are not shifted and are conveyed to byte positions 0 through 3. The first three instruction bytes of I0 are conveyed to decode unit 208A. The remaining instruction byte of I0 is conveyed to decode unit 208B. As discussed above, when decode unit 208B attempts to decode the instruction byte conveyed to it. It will determine that it does not contain the instruction bytes of a complete instruction. Accordingly, decode unit 208B will convey the instruction byte to decode unit 208A. The predecode tags for the instruction bytes of instruction I1 indicate that the instruction bytes should be shifted by two byte positions. Because the instruction bytes of instruction I1 are stored in positions 4 through 6, the instruction bytes are shifted and stored in byte positions 6 through 8. The first instruction byte of I1 is appropriately conveyed to the first byte position of decoder 208C.

Because the value of the predecode tag for the first byte of instruction I2 is less than the predecode tag for the last byte of instruction I1, instruction I2 is conveyed to decode units 208 in the following clock cycle. In one embodiment, the remaining instruction bytes within instruction line 0 are stored in an overflow unit. A new instruction line is then loaded from instruction storage 302. The predecode tag for the instruction bytes stored in overflow unit 314 indicate an offset as if the instruction bytes were stored sequentially beginning at byte position 0. The predecode tags for the four instruction bytes of instruction I2 stored in overflow unit 314 are 0. Therefore, the four instruction bytes are conveyed to byte positions 0 through 3. The last instruction byte of instruction I2 is stored in instruction line 1. The predecode tag associated with this instruction byte is four. Therefore, the instruction byte is shifted four positions and stored in byte position 4. The predecode tag associated with I3 indicates a shift of five positions. Therefore, the instruction byte of I3 is shifted five byte positions to byte position I6. In the next clock cycle, the remaining instruction bytes in instruction line 1 are shifted down. In clock cycle 2, the two instruction bytes of instruction I4 are conveyed to byte positions 0 and 1. The two instruction bytes of instruction I5 are shifted one position and conveyed to byte positions 3 and 4.

Instruction I6 includes five instruction bytes. Because there is an insufficient number of byte positions remaining to receive all the instruction bytes of instruction I6. I6 is not dispatched until the following clock cycle. In one embodiment, a portion of the instruction bytes cannot be conveyed in one clock cycle and the remaining instruction bytes conveyed in another clock cycle. All instruction bytes of an instruction must be conveyed in the same cycle. Therefore, in the illustrated embodiment, the maximum instruction length is nine instruction bytes. It is apparent, that longer instruction lengths can be accommodated by either increasing the number of issue positions or increasing the number of instruction byte positions in each decoder. The five instruction bytes of instruction byte I6 are conveyed to decode units 208A and 208B in cycle 3. Decoder 208C is not utilized in clock cycle 2.

Turning now to FIGS. 4C through 4E, an example of the alignment of instructions is shown with and without branch instructions. In FIG. 4C, instructions I0, I1 and I2 are conveyed to decode units 208A through 208C in clock cycle 0. In clock cycle 1, instructions I3 through I5 are conveyed to the decode units. In clock cycle 2, instructions I6 through I8 are conveyed.

In FIG. 4D, instruction I4 is a taken branch to instruction I8. Because instruction I4 branches to an instruction that has not yet been predecoded, instruction 18 is predecoded to resume the distribution of instruction to decode units with the next available decode unit. In clock cycle 0, instructions I0 through I2 are conveyed to the decode units. In clock cycle 1, the three instruction bytes of instruction I3 are conveyed to decode unit 208A. The two instruction bytes of instruction I4 are conveyed to decode unit 208B. Instruction line 2 is loaded and the three instruction bytes of instruction I8 are conveyed to decode unit 208C.

In FIG. 4E, instruction I4 branches to instruction I1. In the illustrated embodiment, because the predecode tags for instruction I1 have previously been generated, the predecode tags are not recomputed. Therefore, in clock cycle 1, instructions I3 and I4 are conveyed to decode units 208A and 208B. Instruction I1, however, is nol. dispatched until clock cycle 2. The predecode tags previously generated for the instruction bytes of instruction I1 are 0. Because the value of the predecode tag is less than the value of the predecode tag for instruction I4, instruction I1 is dispatched in the cycle following instruction I4. Likewise, the predecode tags for the instructions subsequent to I1 are not regenerated. In another embodiment, the predecode tags of the target instructions of taken branches are regenerated. In this embodiment, instruction I1 would be dispatched to decode unit 208C in clock cycle 1.

Figure 5:
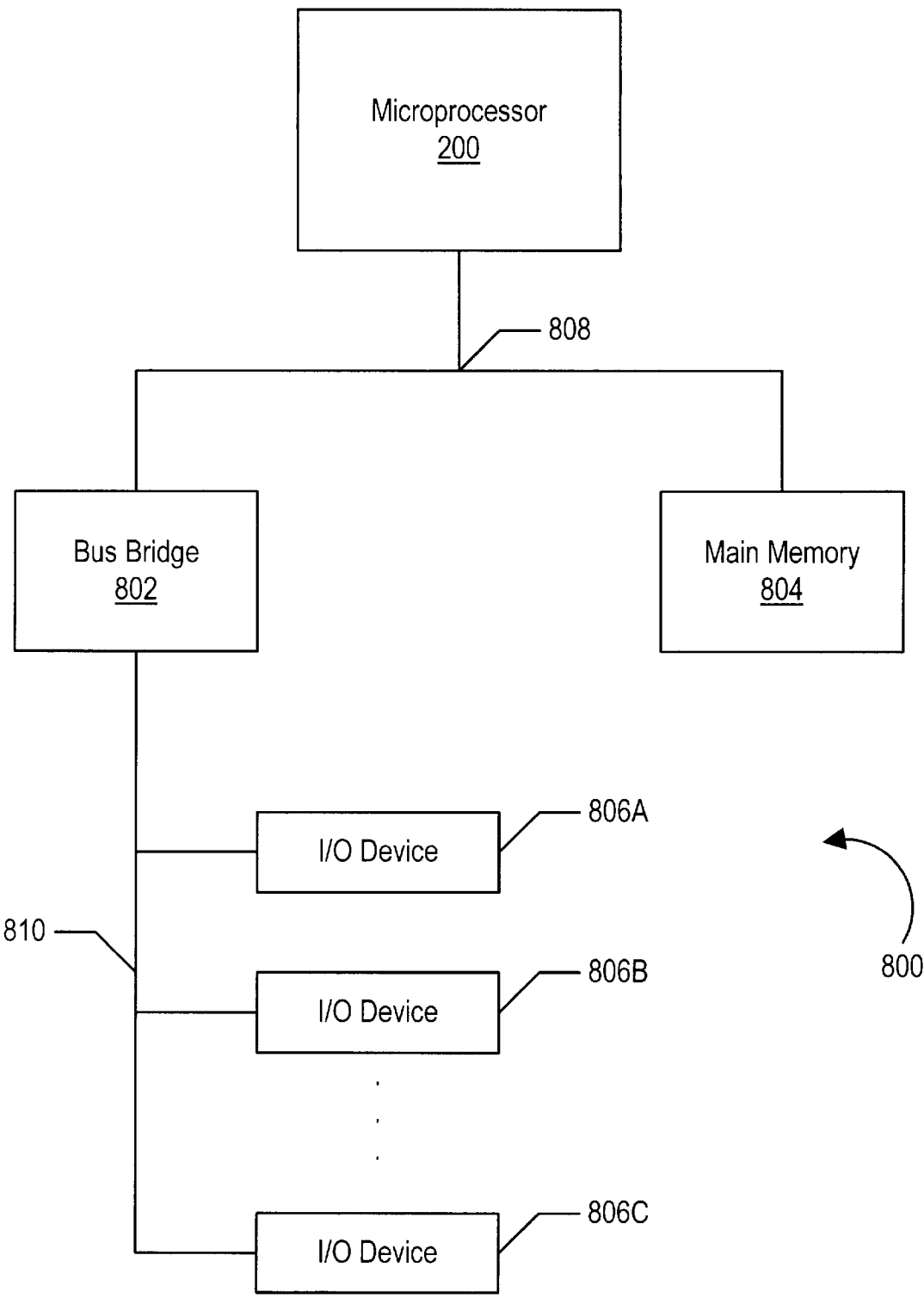
FIG. 5 is a block diagram of a computer system including a superscalar microprocessor that generate predecode tags in accordance with the present invention.

Turning now to FIG. 5, a computer system 800 including microprocessor 200 is shown. Computer system 800 further includes a bus bridge 802, a main memory 804, and a plurality of input/output (I/O) devices 806A–806C. Plurality of I/O devices 806A–806C will be collectively referred to as I/O devices 806. Microprocessor 200, bus bridge 802, and main memory 804 are coupled to a system bus 808. I/O devices 806 are coupled to an I/O bus 810 for communication with bus bridge 802.

Bus bridge 802 is provided to assist in communications between I/O devices 806 and devices coupled to system bus 808. I/O devices 806 typically require longer bus clock cycles than microprocessor 200 and other devices coupled to system bus 808. Therefore, bus bridge 802 provides a buffer between system bus 808 and input/output bus 810. Additionally, bus bridge 802 translates transactions from one bus protocol to another. In one embodiment, input/output bus 810 is an Enhanced Industry Standard Architecture (EISA) bus and bus bridge 802 translates from the system bus protocol to the EISA bus protocol. In another embodiment, input/output bus 810 is a Peripheral Component Interconnect (PCI) bus and bus bridge 802 translates from the system bus protocol to the PCI bus protocol. It is noted that many variations of system bus protocols exist. Microprocessor 200 may employ any suitable system bus protocol.

I/O devices 806 provide an interface between computer system 800 and other devices external to the computer system. Exemplary I/O devices include a modem, a serial or parallel port, a sound card, etc. I/O devices 806 may also be referred to as peripheral devices. Main memory 804 stores data and instructions for use by microprocessor 200. In one embodiment, main memory 804 includes at least one Dynamic Random Access Memory (DRAM) and a DRAM memory controller.

It is noted that although computer system 800 as shown in FIG. 5 includes one bus bridge 802, other embodiments of computer system 800 may include multiple bus bridges 802 for translating to multiple dissimilar or similar I/O bus protocols. Still further, a cache memory for enhancing the performance of computer system 800 by storing instructions and data referenced by microprocessor 200 in a faster memory storage may be included. The cache memory may be inserted between microprocessor 200 and system bus 808, or may reside on system bus 808 in a "lookaside" configuration.

It is further noted that, although the x86 microprocessor architecture and instruction set is shown herein by way of example, the apparatus described may be employed by any microprocessor employing a variable byte length instruction set.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value an n-bit value, one of the n-bit encodings may indicate that the value is invalid. Setting the value to the invalid encoding causes the value to be discarded. Additionally, an n-bit values may include a valid bit indicative, when set, that the n-bit value is valid. Resetting the valid bit may comprise discarding the value. Other methods of discarding a value may be used as well.

It is further noted that aspects regarding array circuitry may be found in the copending, commonly assigned patent application entitled "High Performance Ram Array Circuit Employing Self-Time Clock Generator for Enabling Array Access", Ser. No. 08/473,103, filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,4843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache for storing a plurality of instructions, wherein each of said plurality of instructions includes one or more instruction bytes;
   a predecode unit coupled to said instruction cache and configured to generate one predecode tag associated with each instruction byte of one of said plurality of instructions, wherein each predecode tag indicates a number of byte positions to shift said associated instruction byte;
   a plurality of decode units wherein a first decode unit decodes a designated instruction conveyed to said first decode unit; and
   an instruction alignment unit coupled between said instruction cache and said plurality of decode units, wherein said instruction alignment unit is configured to receive a predecode tag, and wherein said instruction alignment unit conveys an instruction byte to one of said plurality of decode units based solely on said predecode tag, wherein said designated instruction includes one or more instruction bytes conveyed to said first decode unit.

2. The microprocessor of claim 1 wherein said instruction alignment unit comprises a multiplexer wherein said multiplexer routes said instruction byte to one of said plurality decode units based on said predecode tag associated with said instruction byte.

3. The microprocessor of claim 2 wherein said predecode tag indicates a number of byte positions to shift said instruction byte relative to a position of said instruction byte within said instruction cache.

4. The microprocessor of claim 1 wherein each of said plurality of decode units includes a plurality of instruction byte positions configured to receive a plurality of instruction bytes,
   and a predecode tag associated with a start instruction byte of a first instruction causes said instruction alignment unit to convey said start instruction byte to a first instruction byte position of said plurality of instruction byte positions of said first decode unit.

5. The microprocessor of claim 4 wherein other instruction bytes of said first instruction are conveyed to instruction byte positions of said first decode unit.

6. The microprocessor of claim 5 wherein if said first instruction includes more instruction bytes than said plurality of instruction byte positions of said first decode unit, a portion of said plurality of instruction bytes of said first instruction are conveyed to a second decode unit.

7. The microprocessor of claim 6 wherein if a first instruction byte conveyed to said second decode unit is not a start byte, said second decode unit conveys said portion of said instruction bytes of said first instruction conveyed to said second decode unit to said first decode unit.

8. The microprocessor of claim 1 wherein said instruction alignment unit conveys all instruction bytes of an instruction to one of said plurality of decode units.

9. The microprocessor of claim 8 wherein a decode unit includes a plurality of instruction byte positions, and a start instruction byte of an instruction is shifted to a first byte position of one of said plurality of decode units.

10. A method of aligning variable-byte length instructions comprising:
    fetching said variable-byte length instructions from memory and storing said variable-byte length instructions in an instruction cache;
    generating one predecode tag for each byte of a first instruction of said variable-byte length instructions, wherein each predecode tag is indicative of a number of byte positions to shift an associated instruction byte of said first instruction of said variable-byte length instructions; and
    conveying an instruction byte of said first instruction to one of a plurality of decode units based soley on a predecode tag, wherein the predecode tags are generated prior to conveying the instruction byte.

11. The method of aligning variable-byte length instructions of claim 10 wherein each of said plurality of decode units includes a plurality of instruction byte positions configured to store a plurality of instruction bytes, and said variable-byte length instructions include a plurality of instruction bytes.

12. The method of aligning variable-byte length instructions of claim 11 wherein said plurality of instruction bytes include a start byte and said start byte is conveyed to a first instruction byte position of one of said plurality of decode units.

13. The method of aligning variable-byte length instructions of claim 11 wherein each of said plurality of decode units includes three instruction byte positions configured to store three instruction bytes.

14. The method of aligning variable-byte length instructions of claim 11 wherein all instruction bytes of a variable-byte length instruction are shifted to one of said plurality of decode units.

15. The method of aligning variable-byte length instructions of claim 11 wherein a first portion of a variable byte length instruction is conveyed to a first decode unit of said plurality of decode units and a second portion of said variable-byte length instruction is conveyed to a second decode unit of said plurality of decode units.

16. The method of aligning variable-byte length instructions of claim 15 further comprising decoding an instruction byte stored in a first instruction byte position of said second decode unit, and if said instruction byte is not a start byte, conveying said instruction byte to said first decode unit.

17. A computer system comprising:

a microprocessor, wherein said microprocessor includes:

an instruction cache for storing a plurality of instructions, wherein each of said plurality of instructions includes one or more instruction bytes;

a predecode unit coupled to said instruction cache and configured to generate one predecode tag associated with each instruction byte of one of said plurality of instructions, wherein each predecode tag indicates a number of byte positions to shift said associated instruction byte;

a plurality of decode units wherein a first decode unit decodes a designated instruction conveyed to said first decode unit; and an instruction alignment unit coupled between said instruction cache and said plurality of decode units, wherein said instruction alignment unit is configured to receive a predecode tag, and wherein said instruction alignment unit conveys an instruction byte to one of said plurality of decode units based solely on said predecode tag, wherein said designated instruction includes one or more instruction bytes conveyed to said first decode unit;

a main memory coupled to said microprocessor;

a bus bridge coupled to said microprocessor; and an input/output device coupled to said bus bridge.

18. The computer system of claim 17 wherein each of said plurality of decode units includes a plurality of instruction byte positions configured to receive a plurality of instruction bytes, and a predecode tag associated with a start instruction byte of a first instruction causes said instruction alignment unit to convey said start instruction byte to a first instruction byte position of said plurality of instruction byte positions of said first decode unit.

19. The computer system of claim 18 wherein other instruction bytes of said first instruction are conveyed to instruction byte positions of said first decode unit.

20. The computer system of claim 19 wherein if said first instruction includes more instruction bytes than said plurality of instruction byte positions of said first decode unit, a portion of said plurality of instruction bytes of said first instruction are conveyed to a second decode unit.

* * * * *